United States Patent
Miya et al.

(10) Patent No.: US 10,039,302 B2
(45) Date of Patent: Aug. 7, 2018

(54) FROZEN PASTA

(75) Inventors: Youichirou Miya, Fujimino (JP); Hitomi Yamaguchi, Fujimino (JP); Fusaki Kajio, Chou-ku (JP)

(73) Assignee: NISSHIN FOODS INC., Tokyo (JP)

( * ) Notice: Subject to any disclaimer, the term of this patent is extended or adjusted under 35 U.S.C. 154(b) by 276 days.

(21) Appl. No.: 14/117,525

(22) PCT Filed: May 11, 2012

(86) PCT No.: PCT/JP2012/062097
§ 371 (c)(1),
(2), (4) Date: Nov. 13, 2013

(87) PCT Pub. No.: WO2012/157544
PCT Pub. Date: Nov. 22, 2012

(65) Prior Publication Data
US 2015/0118364 A1   Apr. 30, 2015

(30) Foreign Application Priority Data

May 13, 2011   (JP) ................................ 2011-107822

(51) Int. Cl.
| A23L 7/109 | (2016.01) |
| A23L 7/113 | (2016.01) |
| A23L 1/16 | (2006.01) |
| A23L 3/36 | (2006.01) |
| A23P 20/10 | (2016.01) |
| A23P 20/12 | (2016.01) |

(52) U.S. Cl.
CPC ............... *A23L 1/1606* (2013.01); *A23L 3/36* (2013.01); *A23L 7/109* (2016.08); *A23L 7/11* (2016.08); *A23L 7/111* (2016.08); *A23P 20/10* (2016.08); *A23P 20/12* (2016.08); *A23V 2002/00* (2013.01)

(58) Field of Classification Search
CPC ...... A23L 1/1606; A23L 1/0047; A23L 1/005; A23L 1/16; A23L 3/36
See application file for complete search history.

(56) References Cited

U.S. PATENT DOCUMENTS

| 5,211,977 A | 5/1993 | Hauser et al. |
| 6,187,364 B1 * | 2/2001 | Broberg ........................ 426/557 |

FOREIGN PATENT DOCUMENTS

| JP | 54 84047 | 7/1979 |
| JP | 62 294054 | 12/1987 |
| JP | 63-28361 A | 2/1988 |
| JP | 2 245152 | 9/1990 |
| JP | 4 262754 | 9/1992 |
| JP | 8-140607 A | 6/1996 |
| JP | 8 224066 | 9/1996 |
| JP | 9 75023 | 3/1997 |
| JP | 2000 32938 | 2/2000 |
| JP | 2001 299255 | 10/2001 |
| JP | 2004 357659 | 12/2004 |
| JP | 2006 000030 | 1/2006 |
| JP | 2007 49972 | 3/2007 |
| JP | 2007 306841 | 11/2007 |
| JP | 2010 68717 | 4/2010 |

OTHER PUBLICATIONS

Carrie, The Differences in Durum Flour and Semolina (https://www.leaf.tv/articles/the-differences-in-durum-flour-semolina/) Retrieved Feb. 2017.*
Borg, Good Food Gourmet (http://www.goodfoodgourmet.com/pasta/feasting-on-lasagne%E2%80%A6/) Jul. 2010.*
Hunter et. al. Professional Chef , 2007.*
Extended European Search Report dated Sep. 30, 2014, in European Patent Application No. 12784973.5.
Daniela F. Olivera, et al., "Effect of freezing rate in textural and rheological characteristics of frozen cooked organic pasta", Journal of Food Engineering, vol. 90, No. 2, XP 024097764, Jan. 1, 2009, pp. 271-276.
International Search Report dated Aug. 14, 2012 in PCT/JP12/062097 Filed May 11, 2012.
Household USDA Foods Fact Sheet, "Flour, All-Purpose, Enriched", Nov. 2012, Code: 10040, 2 pp., Retrieved from Internet on Jul. 26, 2016.
Encyclopedia; https://foodterms.com/encyclopedia/flour/Idex.html, 2 pp., Retrieved from internet on Jul. 26, 2016.
Wikipedia; https://en.wikipedia.org/wiki/Durum, 4 pp., Retrieved from internet on Jul. 26, 2016.
Sensory Analysis—Wikipedia, at: https://en.wikipedia.org/wiki/Sensory_analysis accessed Jul. 31, 2017 . . . 3 pages.
ISO 8586:2012—General guidelines for the selection, training and monitoring of selected assessors and expert sensory assessors at: http://www.iso.org/iso/catalogue_detail.htm?csnumber=45352, accessed Jul. 31, 2017 6 pages.
Genius Kitchen. "How to Make Homemade Pasta", http://www.geniuskitchen.com/how-to/make-homemade-pasta-42, 10 pp., retrieved from the internet on Jan. 25, 2018.
Serious Eats, "The Science of the Best Fresh Pasta", http://www.seriouseats.com/2015/01/best-easy-all-purpose-fresh-pasta-doug . . . , 12 pp., retrieved from the Internet on Jan. 25, 2018.
Padalino et al, "Overview on the General Approaches to Improve Gluten-Free Pasta and Bread", *Foods*, 2016, vol . 5, No. 87, 20 pp.

* cited by examiner

*Primary Examiner* — Viren A Thakur
*Assistant Examiner* — Lela S. Willams
(74) *Attorney, Agent, or Firm* — Oblon, McClelland, Maier & Neustadt, L.L.P.

(57) ABSTRACT

Provided is a frozen pasta retaining an original flavor of the pasta. A frozen pasta attached with a ground pasta product and/or durum wheat flour. A process for producing a frozen pasta, comprising cooling a boiled pasta and attaching, to the surface of the pasta, a ground product of a pasta, followed by freezing.

16 Claims, No Drawings

FROZEN PASTA

TECHNICAL FIELD

The present invention relates to a frozen pasta retaining an original flavor of the pasta and a process for producing the frozen pasta.

BACKGROUND ART

Conventionally, a frozen pasta produced by boiling a dried pasta and cooling it, followed by freezing has been generally provided. In a process for producing such a conventional frozen pasta, a pasta is boiled and then usually cooled with water. In this case, during cooling, the pasta often loses its flavor. In particular, this phenomenon was significantly observed in a frozen pasta requiring sufficient cooling. For this reason, when a conventional frozen pasta was thawed and eaten, it was inferior to a freshly boiled pasta in the original flavor of the pasta.

To further improve the flavor of a pasta, for example, a process for producing a flavored pasta, which includes mixing a ground starch product, a starch, an emulsifier, a gelatinizing agent, a flavoring composition and soft water, extruding and forming the mixture into a pasta, and bringing the pasta into contact with an aqueous calcium solution, followed by drying, is proposed (Patent Literature 1).

However, even in the pasta produced by the process of Patent Literature 1, since a flavoring composition is kneaded in pasta dough, a frozen pasta produced by using such pasta inevitably loses the original flavor of the pasta during cooling with water. Therefore, when the frozen pasta thus produced is thawed and eaten, the frozen pasta is inferior to freshly boiled pasta in the original flavor of the pasta, and actually, a satisfactory pasta could not be obtained.

CITATION LIST

Patent Literature

[Patent Literature 1] JP-A-4-262754

SUMMARY OF THE INVENTION

The present invention provides a frozen pasta attached with a ground product of a pasta and/or durum wheat flour.

The present invention also provides a process for producing a frozen pasta, comprising a step of cooling a boiled pasta, a step of attaching, to the surface of the pasta, a ground product of a pasta and/or durum wheat flour, and a step of freezing the pasta.

DESCRIPTION OF EMBODIMENTS

The present invention provides a frozen pasta retaining an original flavor of the pasta like a freshly boiled pasta, when thawed and eaten.

The present inventors conducted intensive studies from a variety of angles. As a result, they found that extremely good results can be obtained by cooling a boiled pasta, and then, attaching the surface of the pasta with a ground product of a paste and/or durum wheat flour, followed by freezing. Based on the finding, the present invention was accomplished.

According to the present invention, it is possible to provide a frozen pasta retaining the original flavor of the pasta like a freshly boiled pasta when the pasta is thawed and eaten.

In a process for producing a frozen pasta of the present invention, first, a pasta is boiled. The pasta used herein is not particularly limited as long as it is produced by using durum wheat flour as a raw material. Examples of the pasta include various types of pastas including long-shape pastas such as spaghetti; short-shape pastas such as macaroni and penne; lasagna; and ravioli. These pastas may be dried pastas, semi-fresh pastas or fresh pastas. Furthermore, if necessary, e.g., foodstuff such as meat and vegetable, or seasonings may be stuffed or kneaded.

A pasta is preferably boiled as follows since the texture during eating improves. In the case of a dried pasta, the pasta is boiled such that the boiled pasta becomes about 220 to 245 parts by mass relative to 100 parts by mass of the pasta before boiled (a so-called yield of 220 to 245%). In the case of a semi-fresh pasta or a fresh pasta, the pasta is boiled such that the boiled pasta becomes about 200 to 230 parts by mass relative to 100 parts by mass of the pasta before boiled (a so-called yield of 200 to 230%). Furthermore, a pasta is preferably boiled in the presence of dietary salt since the structure of the pasta gets firm thereby to further improve the texture of the pasta during eating.

Next, the boiled pasta is cooled. Cooling can be made by any method such as water cooling and air cooling; however, water cooling is preferable, since the texture of the cooled pasta during eating is more improved. Water cooling may be performed with water of normal temperature (about 15 to 25° C.); however, cooling is preferably performed with cold water (about 0° C. to 10° C.) since the structure of the pasta gets firm with the result that the texture during eating is improved. The time for cooling a pasta is preferably about 30 to 240 seconds from a viewpoint of firming the structure of the pasta and improving the texture during eating.

Subsequently, the surface of the cooled pasta is attached with a ground product of a pasta and/or durum wheat flour. The ground product of a pasta can be obtained by grinding a pasta. The ground product of a pasta is not particularly limited, as long as it is obtained by grinding a pasta produced by using durum wheat flour as a raw material. Examples thereof include ground products of various types of pastas including long-shape pastas such as spaghetti; short-shape pastas such as macaroni and penne; and lasagna. The ground product of a pasta may be a ground product of a dried pasta, a ground product of a fresh pasta or a semi-fresh pasta. However, in order to retain the original flavor of the pasta, a ground product of a dried pasta is preferable. The particle size of the ground product is preferably 1 mm or less in view of adherability to a pasta surface.

The durum wheat flour is not particularly limited and any durum wheat flour known in the art can be used.

Either one of the ground product of a pasta or durum wheat flour may be contained, and alternatively, both of them may be contained. In order to maintain the original flavor of the pasta, it is preferable that at least a ground product of a pasta is contained. It is further preferable that the ground pasta product and durum wheat flour are gelatinized.

A means for attaching, to a pasta surface, a ground product of a pasta and/or durum wheat flour is not particularly limited. A coating liquid prepared by blending water and the ground product of a pasta and/or durum wheat flour is preferably used because of being convenient and effective.

Preferably, the coating liquid is prepared by blending water and a ground product of a pasta and/or durum wheat flour and heating the mixture. The ground product of a pasta and/or durum wheat flour contained in the coating liquid may be gelatinized by heating.

The content of a ground product of a pasta and/or durum wheat flour in the coating liquid is preferably 1 to 15 mass %, and more preferably 5 to 10 mass % relative to the total mass of the coating liquid. When the content is less than 1 mass %, the pasta must be attached with a large amount of a coating liquid. As a result, the pasta absorbs the liquid and gets soft, with the result that flavor and texture deteriorate. In contrast, when the content exceeds 15 mass %, the viscosity of the coating liquid is increased. As a result, it becomes difficult to handle the coating liquid. Sometimes, it is difficult to attach, to the entire surface of the pasta, the coating liquid since the amount of coating liquid is small.

Furthermore, dietary salt and sugars and the like may be further added to the coating liquid.

A means for attaching, to a pasta surface, such a coating liquid is not particularly limited as long as it is a means capable of attaching, to the entire pasta surface, the coating liquid, and includes spraying, coating and submerging. Among them, spraying is preferable in view of economic efficiency and convenience.

The amount of the ground product of a pasta and/or durum wheat flour to be attached to a pasta surface is 0.1 to 2.0 parts by mass, preferably 0.25 to 2.0 parts by mass, and more preferably 0.5 to 2.0 parts by mass relative to 100 parts by mass of the boiled pasta before frozen. When the amount of ground product of a pasta and/or durum wheat flour to be attached to the pasta is less than 0.1 mass part, the flavor of the pasta when it is thawed and eaten is inferior. In contrast, when the amount exceeds 2.0 parts by mass, the texture of the pasta may often deteriorate.

When the aforementioned coating liquid is used, the amount of the coating liquid to be used is determined in consideration of the amount of the ground product of a pasta and/or durum wheat flour to be attached to the pasta and the content thereof in the coating liquid. The concentration of the coating liquid is desirably controlled such that the amount of liquid to be applied is about 1 to 20 parts by mass, and preferably 1 to 15 parts by mass relative to 100 parts by mass of the boiled pasta.

Subsequently, the pasta attached with a ground product of a pasta and/or durum wheat flour is frozen. In this way, the frozen pasta of the present invention can be produced. It is sufficient that the pasta is frozen at about −10° C. or less. Alternatively, the frozen pasta thus obtained may be further sprayed with water and then refrozen. Owing to the steps of spraying with water and refreezing, overheating of the pasta can be prevented when the pasta is cooked by reheating in a microwave oven; and at the same time, a ground product of a pasta and/or durum wheat flour attached can be kept confined in the pasta surface thereby to prevent them from falling away. As a result, the original flavor of the pasta can be further improved. It is sufficient that the amount of water to be sprayed is about 1 to 20 parts by mass, and preferably about 1 to 15 parts by mass relative to 100 parts by mass of a boiled pasta.

The frozen pasta obtained by the process of the present invention is thawed and, if necessary, cooked with seasoning and then eaten. A method of thawing a pasta is not particularly limited, and e.g., heating in a hot water and heating by a microwave oven are mentioned. Heating by a microwave oven is convenient and preferable. When a person eats a frozen pasta thawed in this way, the person can enjoy the original flavor of the pasta like a freshly boiled pasta.

EXAMPLES

The present invention will be further specifically explained by way of Examples; however, the present invention is not limited to these Examples alone.

Production Example: Coating Liquid

Durum wheat flour ("Duelio" manufactured by Nisshin Flour Milling Inc.) or a ground product of a pasta, which was obtained by grinding dried pasta ("Blue" manufactured by Nisshin Foods Inc., diameter: 1.7 mm, length: 250 mm) to achieve a particle size of 1 mm or less, was mixed with water. The resultant mixture was heated up to 100° C. to gelatinize the durum wheat flour or the ground product of the pasta. To the heated mixture, water was added such that the content of the durum wheat flour or ground of the product of the pasta was set at the contents shown in Table 1 to obtain coating liquids.

TABLE 1

|  | Coating liquid | | | | |
| --- | --- | --- | --- | --- | --- |
| Content (mass %) | 1 | 2 | 3 | 4 | 5 |
| Durum wheat flour | 0 | 5 | 10 | 0 | 0 |
| Ground product of pasta | 0 | 0 | 0 | 5 | 10 |

Test Example 1

(1) In 2 L of boiled water, 200 g of dried pasta ("Blue" manufactured by Nisshin Foods Inc., diameter: 1.7 mm, length: 250 mm) was placed, boiled for 9 minutes and cooled to 5° C. to prepare boiled pasta having a yield of 240%. Subsequently, a container was charged with 200 g of the boiled pasta and 10 g of any one of the aforementioned coating liquids 1 to 5 was sprayed over the boiled pasta. In this manner, the coating liquid was uniformly attached to the entire surface of the pasta. Thereafter, the resultant pasta was placed in a freezer at −30° C. and completely frozen to produce a frozen pasta (Experiments 1 to 5).

(2) For comparison, 200 g of the same dried pasta as above ("Blue" manufactured by Nisshin Foods Inc.,) was placed in 2 L of boiled water, and boiled for 9 minutes to obtain a pasta immediately after boiling (Reference Experiment 1).

(3) The frozen pastas of Experiments 1 to 5 were stored in a freezer overnight and thawed by heating in a microwave oven (500 W) up to 70° C. The pastas were cooked and then the flavors of the pastas were evaluated based on the following evaluation criteria. The flavor of the pasta immediately after boiling obtained in Reference Experiment 1 was evaluated based on the same evaluation criteria. The Evaluation results are shown in Table 2. Note that, each of the numerical values of evaluation is an average value of scores provided by 10 panel members.

Evaluation Criteria
Flavor
  5: The same flavor as that of the pasta immediately after boiling is sensed
  4: Almost the same flavor as that of the pasta immediately after boiling is sensed
  3: The same flavor as that of pasta immediately after boiling is slightly sensed 2: The same flavor as that of pasta immediately after boiling is faintly sensed 1: The same flavor as that of pasta immediately after boiling is scarcely sensed

TABLE 2

| Experiment | Coating liquid | Durum wheat flour or ground product of pasta | (parts by mass per 100 parts by mass of boiled pasta) | Evaluation item Flavor |
|---|---|---|---|---|
| 1 | 1 | — | 0 | 1.3 |
| 2 | 2 | Durum wheat flour | 0.25 | 3.3 |
| 3 | 3 | Durum wheat flour | 0.50 | 3.8 |
| 4 | 4 | Ground product of pasta | 0.25 | 4.3 |
| 5 | 5 | Ground product of pasta | 0.50 | 4.6 |
| Reference Experiment 1 (immediately after boiling) | — | — | — | 5.0 |

Test Example 2

Frozen pastas (Experiments 6 to 11) were produced in the same manner as in Test Example 1 (1) by using the coating liquids prepared in accordance with compositions shown in Table 3 and the same manner as in Production Example. The frozen pastas produced were evaluated in the same manner as in Test Example 1 (3). Evaluation results are shown in Table 4. Note that, evaluation results of Experiments 1, 4 and 5 and Reference Experiment 1 performed in Test Example 1 are shown together in Table 4.

TABLE 3

| Coating liquid (containing 10 mass % of ground product of pasta) | 6 | 7 | 8 | 9 | 10 | 11 |
|---|---|---|---|---|---|---|
| Spray amount (g/boiled pasta (100 g)) | 1 | 2.5 | 7.5 | 10 | 15 | 20 |

TABLE 4

| Experiment | Coating liquid | Durum wheat flour or ground pasta product | (parts by mass per 100 parts by mass of boiled pasta) | Evaluation item Flavor |
|---|---|---|---|---|
| 1 | 1 | — | 0 | 1.3 |
| 6 | 6 | Ground product of pasta | 0.10 | 4.0 |
| 7 | 7 | Ground product of pasta | 0.25 | 4.2 |
| 4 | 4 | Ground product of pasta u | 0.25 | 4.3 |
| 5 | 5 | Ground product of pasta | 0.50 | 4.6 |
| 8 | 8 | Ground product of pasta | 0.75 | 4.6 |
| 9 | 9 | Ground product of pasta | 1.00 | 4.7 |
| 10 | 10 | Ground product of pasta | 1.50 | 4.8 |
| 11 | 11 | Ground product of pasta | 2.00 | 4.8 |
| Reference Experiment 1 (immediately after boiling) | — | — | — | 5.0 |

Test Example 3

Frozen pastas were produced in the same manner as in Test Example 1 (1) by attaching the coating liquids 4 or 5. Thereafter, 5 g of water was sprayed to the frozen pastas and refrozen in a freezer at −30° C. to produce refrozen pastas (Experiments 12 to 13).

These refrozen pastas were evaluated in the same manner as in Test example 1 (3). The results are shown in Table 5. Note that evaluation results of Experiments 4 and 5 and Reference Experiment 1 performed in Test Example 1 are shown together in Table 5.

TABLE 5

| Experiment | Coating liquid | Durum wheat flour or ground product of pasta | (parts by mass per 100 parts by mass of boiled pasta) | Evaluation item Flavor |
|---|---|---|---|---|
| 4 | 4 | Ground product of pasta | 0.25 | 4.3 |
| 5 | 5 | Ground product of pasta | 0.50 | 4.6 |
| 12 (Refrozen) | 4 | Ground product of pasta | 0.25 | 4.4 |
| 13 (Refrozen) | 5 | Ground product of pasta | 0.50 | 4.7 |
| Reference Experiment 1 (immediately after boiling) | — | — | — | 5.0 |

The invention claimed is:

1. A frozen boiled pasta, comprising a ground dried pasta attached to a surface of a boiled pasta which is then frozen to form the frozen boiled pasta,
wherein an amount of the ground dried pasta is from 0.1 to 2.0 pans by mass relative to 100 parts by mass of the boiled pasta before it is frozen.

2. The frozen boiled pasta according to claim 1, wherein a coating liquid comprising the ground dried pasta is attached to the frozen boiled pasta, and
the coating liquid is prepared by a process comprising:
blending water and the ground dried pasta, thereby obtaining a mixture; and subsequently heating the mixture, thereby obtaining the coating liquid.

3. The frozen boiled pasta according to claim 2, wherein an amount of the coating liquid is from 1 to 20 parts by mass relative to 100 parts by mass of the boiled pasta before it is frozen.

4. A process for producing a frozen boiled pasta, the process comprising:
cooling a boiled pasta with water, thereby obtaining a cooled boiled pasta,
attaching, to a surface of the cooled boiled pasta, a ground dried pasta, thereby obtaining a pasta with a surface attachment, wherein an amount of the ground dried pasta is from 0.1 to 2.0 parts by mass relative to 100 parts by mass of the cooled boiled pasta, and
freezing the cooled boiled pasta with the surface attachment, thereby obtaining the frozen boiled pasta.

5. The process according to claim 4, wherein
said attaching is carried out by attaching, to the surface of the cooled pasta, a coating liquid comprising the ground dried pasta,
wherein the coating liquid is prepared by a process comprising:
blending water and the ground dried pasta, thereby obtaining a mixture, and
subsequently heating the mixture, thereby obtaining the coating liquid.

6. The process according to claim 5, wherein the amount of the coating liquid is from 1 to 20 parts by mass relative to 100 parts by mass of the cooled boiled pasta.

7. The process according to claim 4, further comprising:
spraying the frozen boiled pasta with water, thereby obtaining a water-sprayed frozen boiled pasta, and
refreezing the water-sprayed frozen boiled pasta.

8. The process according to claim 5, further comprising:
spraying the frozen boiled pasta with water, thereby obtaining a water-sprayed frozen boiled pasta, and
refreezing the water-sprayed frozen boiled pasta.

9. The process according to claim 6, further comprising:
spraying the frozen boiled pasta with water, thereby obtaining a water-sprayed frozen boiled pasta, and
refreezing the water-sprayed frozen boiled pasta.

10. The process of claim 4, wherein a particle size of the ground dried pasta is 1 mm or less.

11. The process of claim 5, further comprising gelatinizing by heating the ground dried pasta, contained in the coating liquid.

12. The process of claim 5, wherein a content of the ground dried pasta in the coating liquid is from 1 to 15 mass % relative to the total mass of the coating liquid.

13. A frozen boiled pasta, wherein a ground dried pasta is attached to a surface thereof, wherein an amount of the ground dried pasta is from 0.1 to 2.0 parts by mass relative to 100 parts by mass of a boiled pasta before it is frozen, and wherein a dried pasta for the ground dried pasta has along shape, a short shape, or lasagna and is made from flour comprising durum wheat flour as a raw material.

14. The frozen boiled pasta of claim 13, wherein the long shape pasta is spaghetti.

15. The frozen boiled pasta of claim 13, wherein the short shape pasta is macaroni or penne.

16. A process for producing a frozen boiled pasta, the process comprising:
cooling a boiled pasta with water, thereby obtaining a cooled boiled pasta,
attaching, to the surface of the cooled boiled pasta, a ground dried pasta, thereby obtaining a pasta with surface attachment, where in an amount of the ground dried pasta is from 0.1 to 2.0 parts by mass relative to 100 parts by mass of the cooled boiled pasta, and
freezing the cooled boiled pasta with the surface attachment, thereby obtaining the frozen boiled pasta,
wherein a dried pasta for the ground dried pasta has a long shape, a short shape, or lasagna and is made from flour comprising durum wheat flour as a raw material.

* * * * *

UNITED STATES PATENT AND TRADEMARK OFFICE
CERTIFICATE OF CORRECTION

PATENT NO. : 10,039,302 B2
APPLICATION NO. : 14/117525
DATED : August 7, 2018
INVENTOR(S) : Youichirou Miya et al.

It is certified that error appears in the above-identified patent and that said Letters Patent is hereby corrected as shown below:

In the Claims

Column 6, Line 60, "pans" should read --parts--;

Column 8, Line 17, "along" should read --a long--;
       Line 30, "where in" should read --wherein--.

Signed and Sealed this
Sixteenth Day of April, 2019

Andrei Iancu
*Director of the United States Patent and Trademark Office*